3,039,914
PROCESS FOR FORMING A BONDED WET-
FORMED WEB AND RESULTING PRODUCT
Peter A. Reiman, Weston, Mass., assignor to Arthur D.
Little, Inc., Cambridge, Mass., a corporation of Massa-
chusetts
Filed July 7, 1959, Ser. No. 825,411
5 Claims. (Cl. 162—145)

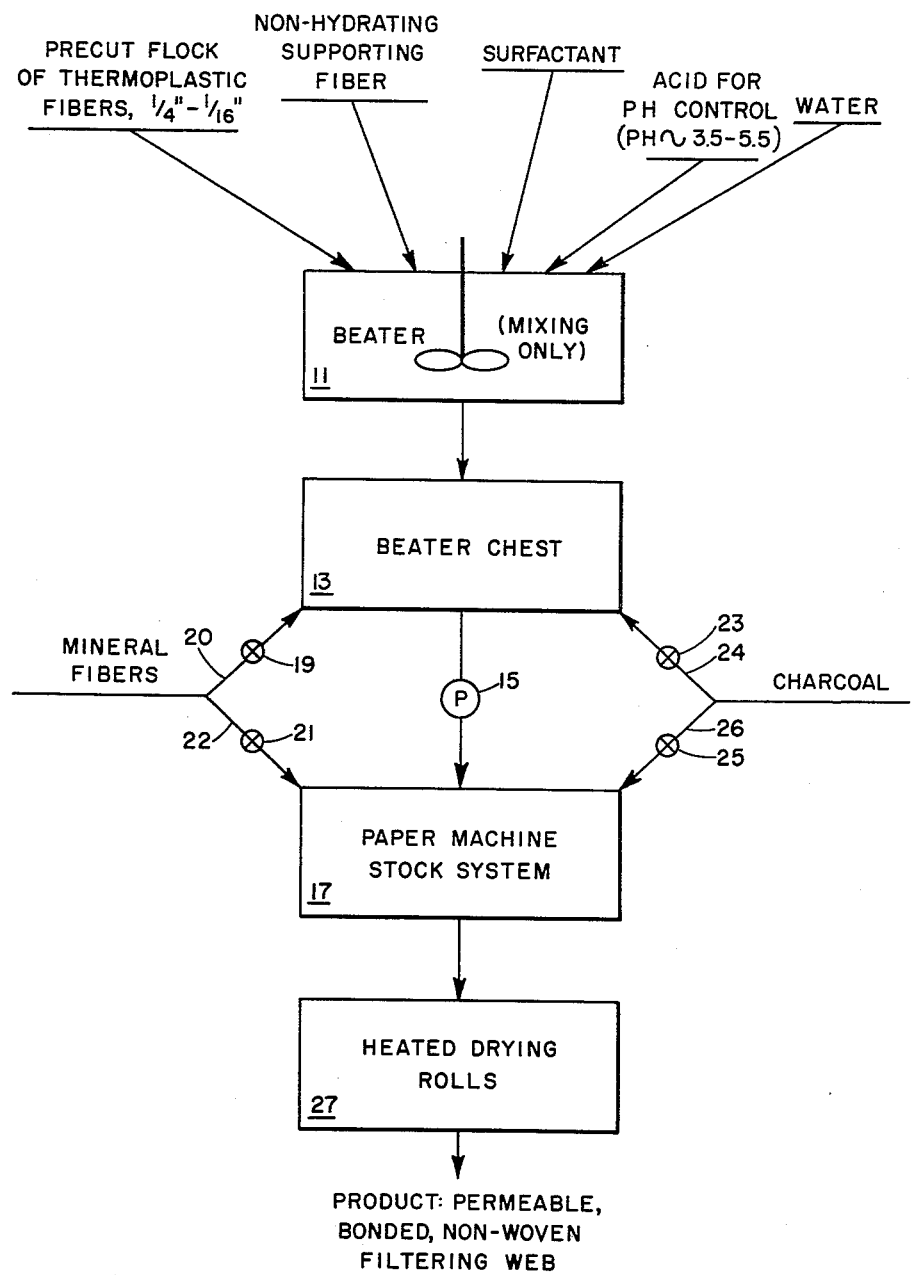

The invention relates to the forming of bonded wet-formed non-hydrating webs by means of thermoplastic fibers, and to the resulting products. In general, this invention is concerned with the preparation of porous non-woven fabrics such as sheets and webs and in particular with such sheets and webs which are capable of acting as highly efficient filters, exhibiting exceedingly low pressure drop and exceptional strength and resistance to tearing and folding.

The use of thermoplastic fibers for the bonding of wet-formed non-hydrating webs is not new. However, the resulting webs have always been relatively weak, lacking in uniformity, and loaded with sand-like particles and fused pills of the thermoplastic fibers. These webs, even when designed for filtering purposes, also have shown poor filtering properties, partly because of the foregoing drawbacks and partly because the best filtering fibers could not be effectively bonded to form a strong web or sheet.

These previous attempts to use thermoplastic fibers in the formation and bonding of wet-formed webs have involved the use of regular ½-inch staple thermoplastic fibers, e.g. of vinyl chloride-vinyl acetate copolymer of relatively low softening point (i.e. softening at regular paper mill drying temperatures), such as "Vinyon." It has been necessary to process such fibers in paper mill beating equipment, in an effort to reduce them to proper size for dispersion and formation of the desired product. Such processing has been carried out in the presence of, or subsequent addition of, such other fibers as are necessary or desirable to form a suitable finished sheet; this sheet as it passes through the drying rolls of the paper mill is subjected to enough heat to soften the thermoplastic fibers and cause them to fuse and thus bond the sheet. However, the beating operation causes a large amount of the staple to ball up and fuse, forming pills and sand-like particles which not only affect adversely the formation and characteristics of the sheet, but render useless, as far as binding effect is concerned, that portion of the staple.

It is therefore quite unexpected to find that these thermoplastic fibers can, by the procedure described below, be used for the bonding of wet-formed webs which have the strength, filtering capacity, and low pressure drop urgently desired for efficient filters, and yet which completely avoid the drawbacks mentioned above. The provision of such filters is a principal object of this invention. Other objects include the provision of strong, coherent, porous non-woven sheets or webs generally, and also the making of filtering sheets containing added filtering media especially of a type not in the class of regular paper-making fibers—e.g. glass fibers, or even non-fibrous particles such as charcoal. Other objects, such as the attainment of the desired ends by a relatively simple manufacturing operation, will appear as the description proceeds.

Although the procedure of this invention may be used in forming sheets of ordinary paper-making fibers plus thermoplastic fibers, no particular advantage is attained over the know procedure for forming such sheets from such paper-making fibers alone. This invention finds particular use in preparing sheets from materials which, when handled by known processes, form either sheets of very poor cohesion or none at all. Such materials are the non-hydrating fibers of synethetic organic type (e.g. viscose) or inorganic type (e.g. glass wool or asbestos), or both, and may also, in conjunction with such fibers, include particles such as charcoal and silica gel and other finely divided material especially that of an adsorbent nature useful for filtering purposes. In the preparation of filters, in accordance with the present invention, I preferably use the non-hydrating, synthetic organic fibers to form the fibrous body of the final product. These fibers are joined or united by the thermoplastic fibers by fusion of the latter at points of mutual contact to form a strong coherent final sheet or web. They are referred to hereinafter as "supporting" fibers. The inorganic or mineral fibers and the adsorbent particles, if used, are added for particular filtering purposes. On the other hand, it is possible to prepare strong coherent webs or sheets using supporting fibers which are entirely inorganic, or a mixture of organic and inorganic fibers. In any event, the supporting fibers are not thermoplastic or otherwise softened at the processing temperatures which I employ to cause the above-mentioned fusion of the thermoplastic fibers.

The accompanying drawing shows a flow sheet illustrating a preferred procedure for carrying out the present invention.

In carrying out the procedure of this invention, I use a precut flock of thermoplastic fibers, of about ⅛-inch lengths and substantially free of fiber fusion, and disperse this flock in a beater 11 with a large quantity of water containing a surfactant and a "supporting" fiber and adjusted to a pH of about 3.5 to 5.5. The consistency of this mixture is about 1%, and in general within the range 9.8% and 1.5%. The beater is operated solely to mix the fibers, and not to beat them. When mixing is complete, the furnish is dropped to the beater chest 13 and thence is pumped by pump 15 into the stock system 17 of the paper machine. Mineral fibers, and particles such as charcoal, which are to be added, are put in at the chest or the head box, preferably the latter in the case of particles. These additions are controlled, in the case of the mineral fibers, by valves 19 and 21 located in lines 20 and 22 respectively, and, in the case of the particles, by valves 23 and 25 located in lines 24 and 26 respectively. Lines 20 and 24 lead to beater chest 13 and lines 22 and 26 to the head box of the paper machine stock system 17. Formation on the wire is at very low consistency, e.g. less than 0.1%. As the resulting wet-formed web moves through the drying rolls 27, the thermoplastic fibers are softened and fused, thereby serving as bonding agents to provide a strong, yet highly porous sheet.

The precut flock may be any thermoplastic fiber which is caused to fuse by the heat of the drying rolls or other drying means normally used in removing water from the sheets or webs, but which is solid and non-tacky at normal temperatures of use of the final product. The flock fibers should be approximately ⅛-inch in length. Lengths in excess of ¼-inch lead to the formation of some of the objectionable pills and sand which have troubled the prior art practice. Lengths of less than 1/16-inch are not only very difficult to prepare, but result in a finished sheet which is generally too weak for most uses.

The supporting fiber may be any fiber of the type referred to above which can be easily dispersed in the beater. As already pointed out, any regular paper-making fiber may be used for this purpose, but the advantages of the present invention are most evident when the supporting fibers are not ones which are ordinarily used for making paper. A good example of a supporting fiber is viscose or other relatively long (say, ¼ inch) unbeaten cellulosic fibers. These supporting fibers are charged into the beater and mixed in the presence of a surfactant and sufficient acid, e.g. sulfuric, to provide a pH of about 3.5 to 5.5, or preferably between 4 and 5. More acidic conditions are likely to do more damage to the equipment than to the composition and product. On the other hand, a pH numerically higher than about 5.5 results in relatively poor dispersion and a tendency to pill. The surfactant wets, and promotes uniform dispersion of, the fiber. Without it, excessive beating is necessary to get uniformity, with resultant fiber damage, pilling, and sand, and consequently a poor sheet. Any one or more of a number of wetting agents may be used; preferably a non-foamer, as otherwise a foam-killer (though not objectionable) will have to be used. The exact order of addition of the foregoing ingredients to the water is immaterial, although it is usually most convenient for good mixing to add the acid and the surfactant to the water before adding the fibers.

The precut thermoplastic fiber is added to the beater containing the supporting fiber, surfactant, and acid, and the total consistency is maintained between about 0.8% and 1.5%, preferably around 1%. A consistency above about 1.5% makes it difficult to mix the fibers effectively without damage to them. The resulting furnish is circulated with no pressure, and merely enough to mix the fibers uniformly, without beating; it is then immediately dropped to the chest.

The non-hydrating fibers referred to hereinabove, such as glass or mineral wool or asbestos or various synthetic fibers are added in the chest, and any particulate matter such as charcoal at the head box immediately prior to formation. Although it is possible to add charcoal in the chest, such procedure is not preferred as there is a tendency toward settling out of the charcoal, or irregular dispersion.

An outstanding and unexpected result of the process of this invention is the ability to make with relative ease strong porous filters containing large amounts, even considerably in excess of 50% by weight, of charcoal. Hitherto, such filters could be made, if at all, only with the greatest difficulty, and only by a dry forming technique. By following the procedure of the present invention, however, it is possible to make these high-charcoal filters on any paper machine, although most conveniently on an inclined wire machine as it produces a thicker sheet, with better formation at lower consistency.

Another significant advantage of the process of this invention is the ability to incorporate glass fibers in significant amounts. Thus, sheets containing about 25% glass fibers by weight of total fibers (including the thermoplastic fibers) are suitable as so-called absolute filters, while sheets containing lesser amounts of glass fibers are suitable as filters of progressively less efficiency in removing particulate matter from a gas stream. However, the basic forming techniques and handling properties of the resulting sheets and filters are not substantially different as between large and small amounts of glass fibers.

The following examples, which are intended to be illustrative rather than limiting, show procedures for making various types of filtering sheets in accordance with this invention.

*Example I*

An adsorbing medium with a charcoal-to-fiber ratio of 3.5 to 1, and a basis weight of 206 pounds (24 x 36—500), of which the fibers make up 46 pounds and the charcoal 160 pounds, was made up from the following formulation:

| | Weight percent |
|---|---|
| Thermoplastic fibers ("Vinyon") | 10.25 |
| Viscose fibers | 10.25 |
| 3A glass fibers | 1.8 |
| Pulverized charcoal | 77.7 |
| | 100.00 |

Procedure was as follows: One hundred pounds of viscose, of about ¼-inch lengths, were dispersed in a beater containing one pound of a surfactant or wetting agent such as "Daxad 27" (a polymerized alkyl aryl sodium sulfonate with an inorganic suspending agent), and approximately 20,000 pounds of water, and at a pH of 4.5. One hundred pounds of the "Vinyon," precut to substantially ⅛-inch lengths, were added to the mixture and circulated briefly, with no roll pressure, to provide a uniform batch. This batch was then dropped directly into the beater chest, where 17.5 pounds of glass wool were added. The mixed stock was then pumped to the machine chest and thence to the head box, where 700 pounds of powdered charcoal, 80–150 mesh, were metered into the furnish and diluted with additional water to provide a consistency of less than 0.1%. Alternatively, part or all of the glass wool may be added at the head box, preferably in a separate water-borne stream. The furnish was run onto the wire and there formed and dried into a final sheet in accordance with usual paper-making practice. The temperature of the drying rolls was sufficiently high to fuse the Vinyon fibers and thus provide a strong, coherent filter sheet exceptionally high in charcoal.

The DOP smoke test performance of the resulting product, in the form of sheets of 100 sq. cm. area, at 32 liters per minute gas flow, showed a pressure drop of 2 mm. water through single sheets and 77% penetration.

*Example II*

Filters of the type shown in Example I are of particular value in removing, by adsorption, undesirable gaseous components. Singly, they are not especially efficient in removing smoke particles, unless they contain much more glass fibers, as is evident from the DOP performance. In order to provide a filter for both smoke and undesired gases, I prepare liner sheets which have no charcoal, but a much higher proportion of glass fibers than those of Example I. These liner sheets serve two principal purposes: they are excellent smoke filters, and when placed over the core filters, they protect the latter from abrasion. Due to their high charcoal content, the core filters lose charcoal rather easily if subjected to any considerable rubbing or rough handling.

Typical liner sheets, having a basis weight of 70 pounds (24 x 36—500), were made up from the following formulation:

| | Weight percent |
|---|---|
| Thermoplastic fibers ("Vinyon") | 42.5 |
| Viscose fibers | 42.5 |
| 3A glass fibers | 15.0 |
| | 100.0 |

Procedure was as in Example I, except of course, for omission of the charcoal.

The DOP smoke test performance of the resulting sheets (100 sq. cm. area), at 32 liters per minute gas flow, showed a pressure drop of 8 mm. water through single sheets and 9.3% penetration. The percent penetration can be lowered to approximately zero by increasing the percentage of glass fibers and reducing the amounts of the other two fibers.

As already mentioned, the thermoplastic fibers are softened and fused by the heat of the drying rolls. If desired, heat for the purpose may be supplied at least in part by auxiliary heating rolls or other heating means, e.g. infrared heaters, beyond the rolls of the paper mill dryer. However, it is in any event necessary that at least the greater part of the fiber fusing takes place while the sheet is drying and before its moisture content is reduced to the final low degree.

A very efficient filter for removing both noxious gases and smokes may be prepared by using several of the core sheets of Example I, say, six such sheets, between two of the liner sheets of Example II. The assembly, duly cut to size, may be inserted in gas masks or the like for individual use by personnel, or may be mounted in larger filtering units, e.g. for treatment of the air in an enclosed area.

The DOP performance of typical multi-ply filters such as the foregoing is illustrated in the following table, wherein 4, 5, or 6 core sheets of the type produced by Example I were placed between two liner sheets such as those made by Example II, using gas flow rates of 32 liters per minute:

| Number of core layers | Pressure drop (mm.) | Percent penetration |
|---|---|---|
| 4 | 35 | .014 |
| 5 | 41 | .013 |
| 5 | 46 | .0015 |
| 6 | 48 | .004 |
| 6 | 48 | .005 |

A surprising and valuable characteristic of the thick multi-ply sheets built up of core and liner sheets as just described is their excellent handling strength. It is thus possible to bend or shape these multi-ply sheets, of a thickness of, say, ¼ inch or even somewhat more, into suitable configuration for use in gas masks or other filtering equipment, without damage to the filtering structure and without loss of filtering properties. Furthermore, the individual liner sheets can be creped without damage to their structure or their filtering ability. These characteristics are not present, at least in satisfactory degree, in hitherto available fibrous filter sheets of comparable filtering efficiency.

The term "fusing" as applied to the action of the thermoplastic fibers herein, means that they soften sufficiently so that each fiber bonds at any points of contact with any other fibers, whether supporting fibers, mineral fibers, or other thermoplastic fibers. The thus "fused" thermoplastic fibers, nevertheless, retain essentially their original form and size, and do not in any way actually melt or coalesce to form sheets, films, "sand," pills, or other non-fibrous entities.

I claim:

1. Process for making a filtering web which consists essentially in preparing a mixture of supporting fibers and a surfactant in water, adjusting the pH thereof to between 3.5 and 5.5, adding to said mixture a flock of thermoplastic fibers cut to lengths between ⅟₁₆ inch and ¼ inch, uniformly mixing the aforesaid ingredients without significant beating or fiber damage, while providing and maintaining a consistency between about 0.8% and 1.5%, adding thereto mineral fibers, and thoroughly mixing, adjusting the consistency of the resulting mixture to less than 0.1%, by addition of water, forming a sheet from the resulting furnish on a paper machine and drying the sheet on heated drying rolls to form a permeable, bonded, non-woven web, said thermoplastic fibers being solid and non-tacky at ordinary temperatures but softening under the heat of the drying rolls, the heat of said rolls being such as to cause bonding of said thermoplastic fibers at points of contact with each other and with other fibers in the web, without significant change in their form or size, thereby bonding the web into a strong sheet while maintaining porosity, said supporting fibers being non-hydrating organic fibers which remain solid and non-tacky during the process and under the heat of the drying rolls.

2. Process according to claim 1 wherein said thermoplastic fibers are of vinyl chloride-vinyl acetate copolymer and said supporting fibers are unbeaten viscose fibers approximately ¼ inch in length.

3. Process according to claim 1 wherein a powdered adsorbent is added subsequent to said mixing of thermoplastic and supporting fibers and prior to said sheet formation.

4. Process for making a filtering web which consists essentially in preparing a mixture in water of unbeaten viscose fibers about ¼ inch in length and a surfactant, adjusting the pH thereof to between 3.5 and 5.5, adding to said mixture a flock of thermoplastic fibers having lengths between ⅟₁₆ inch and ¼ inch, and in an amount by weight approximately equal to that of said viscose fibers, uniformly mixing the aforesaid ingredients without significant beating or fiber damage, while providing and maintaining a consistency between about 0.8% and 1.5%, adding thereto mineral fibers, and thoroughly mixing, adding finely divided charcoal and adjusting the consistency of the resulting mixture to less than 0.1%, by addition of water, and then forming a sheet from the resulting furnish on a paper machine and drying the sheet on heated drying rolls to form a permeable, bonded, non-woven web, said thermoplastic fibers being solid and non-tacky at ordinary temperatures but softening under the heat of drying rolls, the heat of said rolls being such as to cause bonding of said thermoplastic fibers at points of contact with each other and with other fibers in the web, without significant change in their form or size, thereby bonding the web into a strong sheet while maintaining porosity, said mineral fibers being present in an amount equal to about 1.8% to 25% of the weight of the final sheet, said charcoal being present in an amount up to about 78% by weight of said sheet.

5. Process according to claim 4 wherein said thermoplastic fibers are vinyl chloride-vinyl acetate copolymer.

References Cited in the file of this patent

UNITED STATES PATENTS

| | | |
|---|---|---|
| 1,147,991 | Jaraczewski | July 27, 1915 |
| 1,829,585 | Dreyfus et al. | Oct. 27, 1931 |
| 2,357,392 | Francis | Sept. 5, 1944 |
| 2,521,985 | Lang et al. | Sept. 12, 1950 |
| 2,593,146 | Howard | Apr. 15, 1952 |
| 2,797,163 | Smith et al. | June 25, 1957 |
| 2,913,365 | Osborne et al. | Nov. 17, 1959 |